June 10, 1941.  J. J. GRABFIELD  2,245,527
PHOTOGRAPHIC DEVICE
Filed Nov. 23, 1938   2 Sheets-Sheet 1
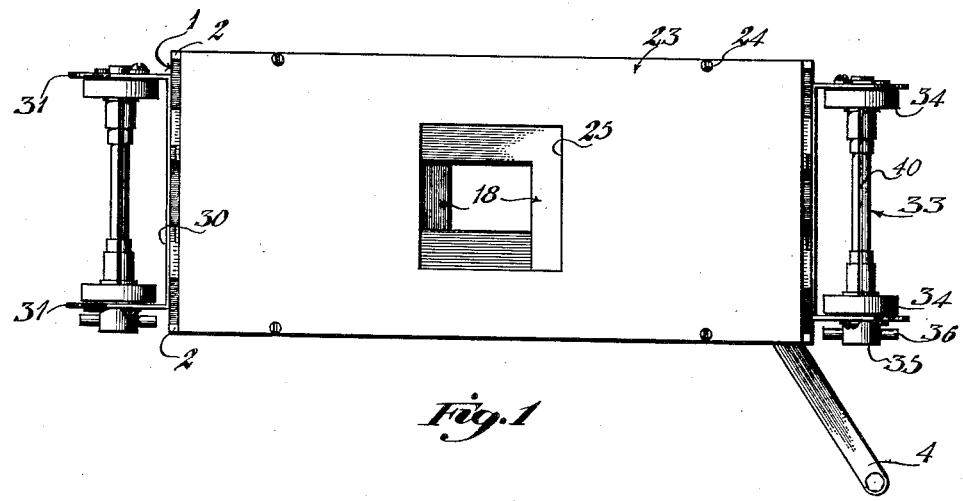
Fig. 1
Fig. 2
Fig. 3
INVENTOR.
John J. Grabfield
BY Wood & Wood ATTORNEYS.

June 10, 1941.  J. J. GRABFIELD  2,245,527
PHOTOGRAPHIC DEVICE
Filed Nov. 23, 1938   2 Sheets-Sheet 2
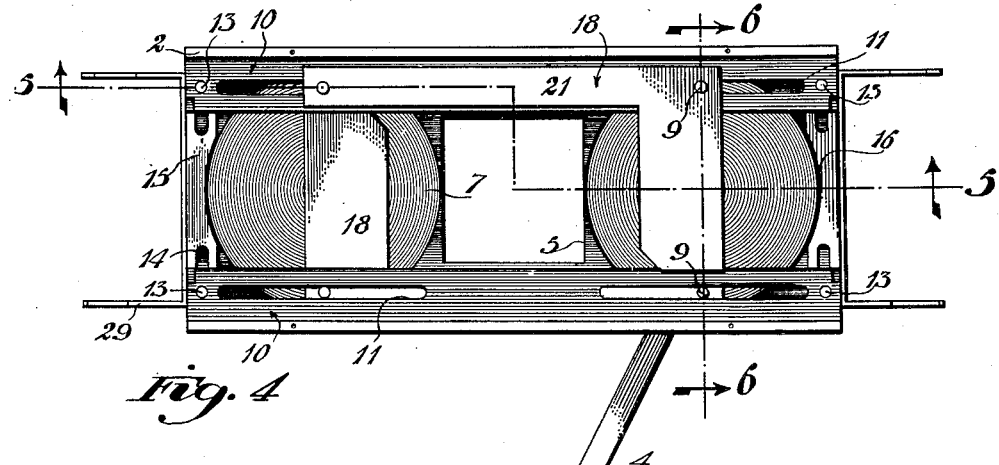
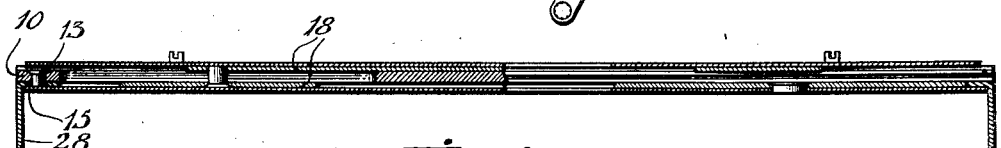
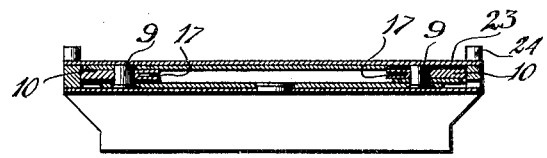
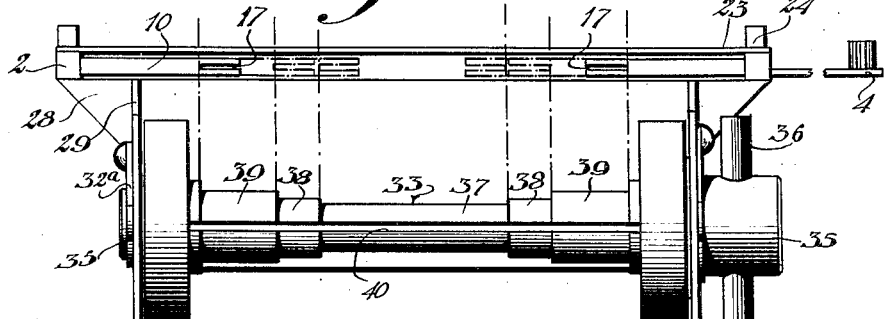

Patented June 10, 1941

2,245,527

UNITED STATES PATENT OFFICE 2,245,527

PHOTOGRAPHIC DEVICE

John J. Grabfield, Cincinnati, Ohio, assignor to General Devices Corporation, Cincinnati, Ohio, a corporation of Ohio Application November 23, 1938, Serial No. 242,028

12 Claims. (Cl. 88—24)

This invention relates to a device for projection printing of photographic negatives. The invention is directed particularly to a negative carrier adapted to be used in a photographic enlarger. The device is constructed and arranged for sustaining the negatives during projection of the images they contain in the enlarging machine, for guiding and reeling a strip of negatives through the machine and for masking light from negatives of the strip other than the negative being exposed.

An objective of the invention has been to provide a universal negative carrier that will accommodate negatives of the various width for projection in the usual manner upon sensitized photographic paper.

A further objective has been to provide means for reeling a strip of negatives through the carrier for serial exposure of the images which they contain, and for supporting the film of the strip at its edges so that its surfaces may not be scratched or marked. During the recent years roll film has been employed much more extensively, particularly by the amateur photographers, than the old type cut film, or plates, or film packs. The strips of film are of substantial length, particularly so in the case of the 35 millimeter so-called candid camera film which usually contains eighteen or thirty-six exposures. For storage reasons it is not convenient to cut this film into small lengths. It is usually reeled into a roll of small diameter and stored in the can or container in which it originally was packaged. If a strip of film of this length is disposed in a projection printer, either one end of the film or both beyond the frame being exposed is left to dangle from the machine or otherwise is arranged into a loose roll and reposed in a hanger or basket. In either instance the film is apt to become scratched through the frequent handling of it that is required as the strip is fed through the enlarger.

It is the usual experience, however, that frequent handling gives rise to scratches and finger marks on the film and these cause defects in the printed picture. To overcome these defects it has been the objective to provide a universal negative carrier including means for mechanically reeling the film through the carrier as the various frames of images are being projected.

It also has been the objective to provide a carrier for the film including masking elements for the edges of the picture image carried on the film, to obstruct the light from the adjoining film areas. The mask provides a projected picture having sharp line borders.

Briefly, the invention contemplates a negative carrier for guiding and tracking the film for projection of the successive frames. For the accommodation of films of various widths, the guides or tracks are relatively adjustable toward and from one another. Masking elements, which also are relatively movable, are provided for cooperation with the guides or tracks for masking the edge sections of the frame of the negative being exposed. In the preferred structure, disc means is provided for moving the tracking and masking elements in unison, for convenience in the adjustment of the device for reception of film of any given size. Next, reeling means are provided on the opposite ends of the device for the feeding and reception of the strip of film. These reels are of stepped construction to provide a series of flanges defining channelways for respective accommodation of the films of various widths; the channelways on the reels are disposed centrally of the masking device and the film therefore is aligned properly within the masking aperture regardless of its size. The device is placed for use in the photographic enlarger beneath the condensing lens in place of the glass pocket-books or film carriers with which most of the enlarging machines are presently equipped.

The drawings illustrate a preferred embodiment of the present invention. In the drawings, Figure 1 is a plan view of the assembled structure.

Figure 2 is a side elevation of it.

Figure 3 is an exploded view showing the relative arrangement of the parts of the masking assembly.

Figure 4 is a plan view of the assembly with the cover plate removed.

Figure 5 is an enlarged sectional view taken longitudinally through the device.

Figure 6 is an enlarged sectional view transversely of the device.

Figure 7 is an end view of the assembled structure.

The device which is illustrated in the drawings is comprised of a base piece indicated generally at 1. A pair of flanges 2 are carried at the longitudinal edges of the base to define a channeled housing for the masking structure. One of the flanges is slotted as at 3 for the passage of an adjusting lever 4, of which the details are described at a later point in the specification.

The base contains a central aperture 5 for the transmission of light from the image and it also contains a pair of bores 6—6 spaced from the central aperture and in longitudinal alignment with it. A pair of discs 7—7 are disposed for rotation upon the base. Each of the discs contains a central pivot 8 traversing a respective bore 6 for pivotal rotation of the plate. The lever arm 4 extends through the slot 3 and is fastened to one of the discs 7. Each disc contains a pair of driving pins 9. These pins are disposed at diametric opposite points on the discs and project therefrom.

Guideways 10—10 are disposed on opposite sides of the central aperture 5 longitudinally of the base. Each guideway contains a pair of slots 11—11. The pins 9 extend through the slots for moving the guideways relatively toward and from one another. In order to prevent longitudinal displacement of the guideways they are provided with positioning pins 13—13; these are tracked and guided in respective grooves 14, which are contained in cross pieces 15—15. The guide plates extend transversely of the base at opposite ends of it. For compactness of structure the cross pieces are relieved as at 16 to clear the peripheries of the adjacent discs 7.

The inner edges of each of the guideways 10 contain a longitudinal groove 17. These grooves cooperate to define the passage for sustaining and guiding the film. These edges of the guideways also serve to mask the longitudinal edges of the image frame upon the film.

For masking the edges transversely of the film the elements 18—18 are provided. These elements are arranged oppositely to one another in the masking device and each contains a portion 19 having a masking edge 20 and a connector leg portion 21. The connector leg portion of each element contains bores 22—22 for cross connecting the corresponding pins 9—9 of the respective pairs carried on the discs 7.

In the preferred structure, the masking elements 18 are arranged relatively above and below the guides 10, as shown in Figure 4, in order to avoid binding of the parts upon one another, though this arrangement is not requisite.

The arms 21 and the mask elements 18 interconnect the pins 9 of the discs 7 and therefore these discs are moved in unison. As the discs drive the guideways to bring them closer together or farther apart the side edge masking elements 18 are moved proportionately. There is a proportional adjustment in the width of the frame of the pictures as well as the length each time the lever arm is adjusted.

Over the assembly which has just been described, a cover plate 23 is disposed. The cover plate is mounted on the assembly by means of the screws 24 which pass through it into threaded engagement with the longitudinal flanges 2. The latter flanges are so dimensioned that the cover plate is in slight frictional contact with the uppermost masking element 18. The cover plate is provided with a central aperture 25 which coincides with the aperture 5 in the base. In the preferred construction, the guideways are extended beyond the ends of the cover plate, and the upper surfaces of the guideways respectively are notched to expose the grooves, so that film conveniently can be positioned within the notches for reception into the grooves.

At each end of the base an angle piece 28 is struck or mounted to project downwardly for carrying a roll mounting bracket 29. This bracket is of U-shape and comprises a base portion 30 in engagement with the angle piece 28 and bracket arms 31—31 which project laterally from it. These bracket arms are slotted as at 32 for the reception of the roll. The rolls are held in rotatable position in the slots 32—32 by snap springs 32a.

The film carrying rolls are comprised of a central film-carrying shaft or reeling portion 33 and flanges 34—34 at the ends of the film carrying shaft. Stub shafts 35 project beyond the respective flanges for reception and rotation within the slots 32 of the brackets and one of the stub shafts for each roll is extended and bored to receive a pin or suitable knob 36 for rotating the reel.

The film carrying portion of the reel is counterturned to provide stepped diameter portions, the smallest, 37, being of a width suited for reception of the narrowest film intended to be used. The steps 38—38 constitute flanges defining the reel for the narrow film and, in turn, constitute the reel for the next wider film. Likewise the steps 39—39 constitute the flanges defining the reel 38 and, in turn, constitute a reel for the next wider film, and so forth, for the various widths of film intended to be used in conjunction with the device. The reeling shaft contains a central slot 40 extending between the flanges 34 and the film intended to be reeled on any of the stepped diameters is threaded through the slot for driving connection.

In using the device, the film containing the images to be projected in the enlarging machine is first threaded through the slot in one of the reels and located thereon in alignment intermediate the stepped diameters defining its width. The reel is then inserted in its mounting on the bracket and the film is threaded into the slots of the guideways upon adjustment of the lever arm until the guideways are spaced to accommodate the film. The film is fed through the guideways by hand or by means of a leader strip attached to the film, until it emerges at the opposite end of the device and the projecting portion is then threaded into the slot of the other roller. The device is then put into the enlarging machine and the film is reeled through the masking device until the image frame on the negative which is desired to be printed is located within the masking aperture, and the film is thus sustained with the image properly masked and ready for projection.

The film is carried at its edges only in passing from the one reel to the other, and is out of surface contact with any of the metallic masking elements. Therefore all danger of marring the surface of the film with scratches or fingerprints is avoided.

The device may be used separately for insertion into a conventional energizing machine or may be built into the enlarger or attached permanently to it.

Having described my invention, I claim:

1. A photographic negative carrier comprising a base having an aperture, a pair of guideway elements relatively movable upon the base in parallel relationship and having grooved apertures for reception of photographic film therebetween, a pair of masking elements extending across the area intermediate the guideways and also relatively movable in parallel relationship, and rotatable elements carried upon the base and having opposing journals spaced equidistantly from the respective centers of rotation, the journals interconnecting the guideways and the masking elements for moving the guideways and masking elements in unison for maintenance of the parallel relationship of the guideways and the masks.

2. A photographic film carrier comprising a pair of guideway elements relatively movable toward and from one another in parallel relationship and having grooves for the reception and support of film therebetween, a pair of masking elements relatively movable toward and from one another and extending transversely of the guideways for defining a rectangular aperture in cooperation with the guideways, and pairs of flat rotatable discs having driving pivots offset from the centers of rotation of said discs, the pivots being in respective connection with the guideways and the masks for moving the guideways and the masks in unison when the discs are rotated.

3. The device for carrying and masking photographic film negatives comprising a base having an aperture, a pair of rotatable elements mounted upon the base adjacent the aperture, each rotatable element having a pair of driving journals at opposite points upon its surface for corresponding movement, guideway elements in movable connection with corresponding journals of the pairs on the rotatable elements, and defining a guideway for photographic film therebetween, masking elements extending transversely of the guideway elements, each being in respective connection with the corresponding journals of a pair upon the rotatable elements, and means for moving one of the rotatable elements.

4. A device for reeling and for masking selected portions of a strip of photographic negatives, comprising a base having an opening therein, a pair of guideways mounted for movement toward and from one another upon the base, on opposite sides of the aperture, and having grooves for edgewisely tracking photographic film therebetween, substantially flat members rotatable in planes substantially parallel with the plane of the base, said rotatable members having opposing driving pivots in respective connection with the guideways for moving the guideways relatively toward and from one another, masking elements extending transversely of the guideways for defining a masking aperture therewith, and means for moving the masking elements toward and from one another relatively as the guideways are moved.

5. A device for reeling and for masking selected portions in a strip of photographic negatives, comprising a base having an opening therein, a pair of longitudinal masking elements mounted for movement toward and from one another upon the base and having grooves defining a film track therebetween, rotatable disc means having opposing driving journals in respective connection with the said masking elements for moving them relatively toward and from one another, other masking elements extending transversely of the first for defining a masking aperture therewith, and means for moving the said other masking elements toward and from one another relatively as the first are moved.

6. A device for supporting photographic film material in strip form and for framing a selected negative image of the strip, comprising a pair of guideways having marginal grooves for supporting a photographic film therebetween, support means positioning the guideways for relative movement toward and from one another over said support means, a pair of flat members mounted for rotation through planes substantially parallel to the plane of the base and having opposing journals in respective connection with the guideways, the journals being relatively interconnected for driving the guideways toward and from one another in parallel relationship when one of said rotatable members of the pair is moved, masking elements extending transversely of the guideways and therewith delineating a framing aperture for the passage of light, and means for moving the masking elements relatively toward and from one another in parallel relationship when the guideways are moved.

7. A photographic device for sustaining and masking negatives of a strip, comprising a pair of guideway elements, marginally grooved for tracking reception of a strip of negative material therebetween, means for guiding the guideways relatively toward and from one another, masking elements extending transversely of the guideways and therewith delineating an aperture for the passage of light through a negative carried in the guideways and rotatable drive members interconnecting the masking elements and the guideways for relative parallel movement of the guideways and the masking elements respectively toward and from one another when one of the drive members is driven, the ends of the guideways containing cavities defining entrance ways to the grooves thereof, and the drive members, the guideway and masking elements all being substantially flat residing in parallel planes adjacent one another and collectively forming a flat pack assembly.

8. A photographic device for carrying and masking photographic negatives of strip form, comprising, a pair of longitudinal masking elements, a pair of masking elements transverse the longitudinal masks, means for guiding the strip of film intermediate the pair of longitudinal masks, rotatable elements having opposing pivots spaced equidistantly from the centers of rotation of the rotatable elements, the masking elements of the respective pairs being in connection with corresponding pivots of the rotatable elements for operation in unison, whereby parallelism between the respective pairs of masking elements is maintained, the rotatable elements being substantially flat members residing in planes substantially parallel with the planes of movement of the said masking elements.

9. A photographic device for carrying film negatives in strip form for photographic projection of the images thereon, comprising, a pair of longitudinal masking elements in spaced parallel relationship, a pair of masking elements in spaced parallel relationship transverse the longitudinal masks, means for guiding film in strip form intermediate the longitudinal masks, and drive elements mounted for rotation in planes parallel to said masking elements, and having opposing journals spaced equidistantly from the respective centers of rotations of the rotatable elements, the masking elements of the pairs being in respective connection with corresponding journals of the rotatable elements for operation of the masking elements in unison, whereby parallelism between the respective pairs of masks is maintained.

10. A photographic enlarging machine, comprising, a photographic negative carrier including a pair of longitudinal masking elements, means for guiding a strip of photographic negative material therebetween, a pair of masking elements extending transversely of the longitudinal masks, both the longitudinal and the transverse masks being in spaced parallel relationship with one another, a rotatable element having opposing journals spaced equidistantly from the center of rotation of the element, with a longitudinal mask and a transverse mask being in connection with one of the journals, and another longitudinal mask and the other transverse mask being in connection with the other journal, and means operable in unison with the rotatable element for maintaining parallel relationship between the transverse and longitudinal masks when the rotatable element is rotated.

11. A device for carrying and masking photographic negatives of strip form, comprising, a base having an aperture, a pair of rotatable elements mounted upon the base adjacent the aperture, each rotatable element having a pair of driving journals at opposite points upon its surface for corresponding movement, guideway elements in movable connection with the corresponding journals of the pairs of the rotatable elements and defining a guideway for photographic film therebetween, masking elements extending transversely of the guideway elements, each being in respective connection with the corresponding journals of a pair upon rotatable elements, means for preventing longitudinal movement of the guideway elements when the rotatable elements are rotated, and means for rotating one of the rotatable elements.

12. A photographic film carrier, comprising a substantially flat pack assembly of elements including, a pair of longitudinal masking elements having edges in spaced parallel relationship, a pair of masking elements, likewise having edges, in spaced parallel relationship, extending transversely of the longitudinal masks, disc elements rotatable in planes parallel with the said pairs of masking elements and having opposing journals spaced equidistantly from the respective centers of rotation of the disc elements, and means interconnecting the rotatable elements for rotation in unison, the masking elements being arranged in connection with the said journals for movement of the respective pairs in parallel toward and from one another, and in unison when one of the rotatable elements is rotated.

JOHN J. GRABFIELD.